SIMULTANEOUS WRITE-READ MAGNETIC RECORDING SYSTEM

Filed Feb. 27, 1964

MICHAEL J. MARKAKIS
INVENTOR.

BY Stuart Lubitz
ATTORNEY 3,365,708
Patented Jan. 23, 1968

3,365,708

SIMULTANEOUS WRITE-READ MAGNETIC RECORDING SYSTEM

Michael J. Markakis, Palo Alto, Calif., assignor to Ampex Corporation, Redwood City, Calif., a corporation of California Filed Feb. 27, 1964, Ser. No. 347,936
6 Claims. (Cl. 340—174.1)

ABSTRACT OF THE DISCLOSURE

Apparatus for writing and immediately reading out the history in a magnetic medium during a single pass of the medium utilizing a single magnetic head. Means is provided for initially establishing a selected flux condition in the medium and switching means is provided for selectively coupling and decoupling the single magnetic head to and from both the write and the read circuits at particular intervals during the single pass of the medium.

Figure 1:
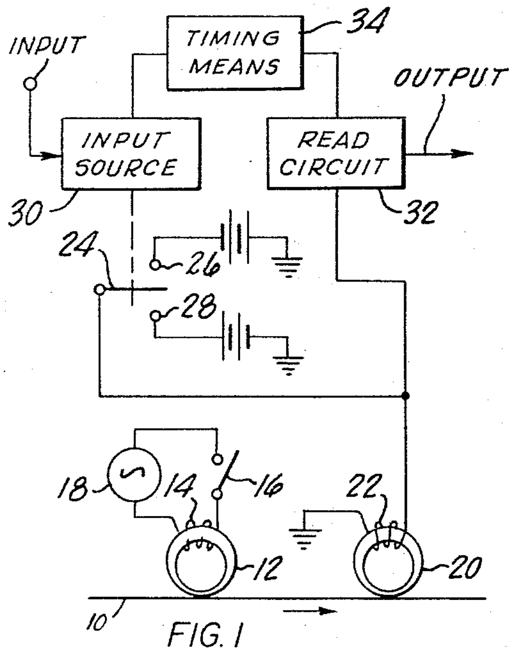

Probably the earliest digital recording technique employed is the pulse recording technique in which a continuous negative saturation signal is applied to a write head to record a bniary "0" and a positive saturation pulse is applied to record a binary "1." The recording technique which is no doubt most prevalently used today is the non-return-to-zero (NRZM) recording method in which the magnetic medium is driven through a flux change each time a "1" is to be recorded, that is, the current level applied to the head is usually maintained constant unless a "1" is to be written. Thus, for a series of successive binary "0" a first current level will be continuously applied to the head while for a series of successive binary "1," the current level will be reversed at spaced intervals but always assuming fixed levels for a given interval. In another type of non-return-to-zero recording (NRZC) the current level is changed each time the successive bit to be recorded changes from a "1" to a "0." A series of "1's" would result in a constant current level for a period determined by the number of successive "1's." The recording of a "0" following these "1's" would result in a reversal of the current and a new current level having an equal but opposite polarity.

In both pulse recording and NRZ recording, some current level has to be maintained in the head winding at all times. As a consequence, a single head cannot be provided which is capable of both recording and reproducing during a single pass of the magnetic medium by the head.

Consequently, it is an object of the present invention to provide a magnetic recording system in which a single head can write information on and read information from a magnetic medium moved by the head only once.

It is a more specific object of the invention to provide a method of digital recording which enables a single head to read and write digital information on a magnetic medium moved by the head a single time.

In accordance with the invention, a first system is disclosed herein which is based upon the recognition that the previously known pulse return-to-zero (RZ) method of recording can be employed in a recording system utilizing a single head for reading and writing. In this embodiment, an alternating current signal can be applied to the winding of an erase head coupled to the moving magnetic medium to establish a zero magnetic remanent flux condition thereon. Opposite polarity pulses can then be applied to the winding of the single read-write head dependent upon whether a "0" bit or a "1" bit is to be recorded. The medium can be moved either incrementally or at a relatively slow continuous speed. Where the medium is moved incrementally, the recording pulse is preferably applied to the head winding when the medium is stationary and extinguished before movement starts. Subsequent movement of the medium induces an output signal in the head winding whose polarity is indicative of the state of the recorded bit. Where a continuous moving, rather than incrementally moving, medium is employed, the recording pulse is extinguished before the fringe of the recorded signal moves past the read-write head gap.

In a preferred embodiment of the invention, a return-to-bias (RB) method, rather than an RZ method, of recording is employed. In the RB method, a direct current, rather than an alternating current, is applied to the erase head winding to bias the magnetic flux in the medium in one direction which may be representative ot "0's." In order to record binary "1's," a unidirectional pulsing current is applied to the read-write head winding which switches the flux in the portion of the magnetic medium within the influence of the head. The RB method has the advantage, as compared to the RZ method, of requiring a recording pulse of only one polarity and of providing an output signal having substantially twice the amplitude of the signal derivable using the RZ method.

Figures 2A, 2B, 2C:
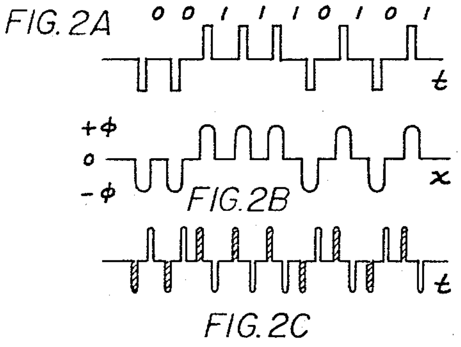

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a diagrammatic view of a magnetic recording system constructed in accordance with the present invention employing an RZ method of recording;

FIGURES 2(*a*), (*b*), (*c*) respectively illustrate waveforms of a write current applied to the read-write head of FIGURE 1, the magnetic medium flux changes resulting as a consequence of that write current, and the output voltage induced in the read circuit as a consequence of a recorded bit.

Figure 3:
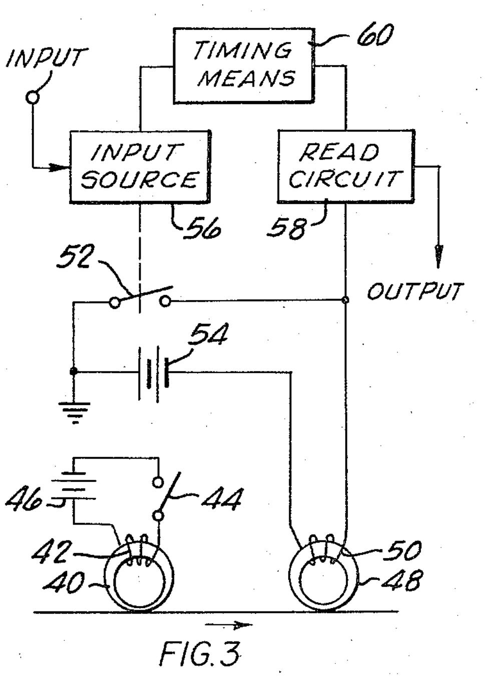
Figures 4A, 4B, 4C:
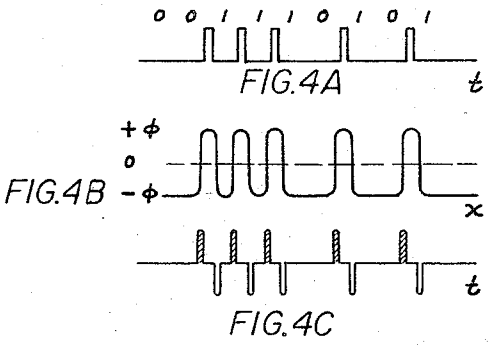

FIGURE 3 is a diagrammatic illustration of a magnetic recording system employing an RB method of recording; and FIGURES 4(*a*), (*b*), (*c*) respectively illustrate waveforms of a write current applied to the read-write head of FIGURE 3, the magnetic medium flux changes resulting as a consequence of that write current, and the output voltage induced in the read circuit as a consequence of a recorded bit.

Attention is now called to FIGURE 1 which diagrammatically illustrates a magnetic recording system utilizing an RZ recording method which permits a single head to both write and read information on a magnetic medium by moving the medium past the head a single time.

More particularly, a magnetic medium, for example, a magnetic tape 10 defining a plurality of recording tracks thereon, is provided. The tape is adapted to be moved in the direction of the arrow by a drive means (not shown). A first magnetic head 12 is positioned adjacent the magnetic surface of the tape 10 and is preferably coupled to all of the tracks thereon. A winding 14 is coupled to the head 12 and is connected through a switch 16 to an alternating current source 18. By closing the switch 16 and by moving the tape 10 by the head 12, the entire tape is demagnetized; i.e., the residual remanent flux along the tape is reduced to zero.

Digital information can be written on and read from each track on the tape by a single head 20. A different head 20 is coupled to each different recording track. A winding 22 coupled to the head 20 is connected between ground and the pole 24 of a single pole-double throw switch. The pole 24 can be selectively engaged with a source of negative potential connected to contact 26 or a source of positive potential connected to contact 28, or to open circuit (no current). The pole 24 is moved in response to binary digits successively provided by an input source or write circuit 30. The ungrounded side of winding 22 is additionally connected to an output register or read circuit 32. A timing means 34 is connected to both the input source 30 and read circuit 32 to alternately enable them. That is, when the input source 30 causes the pole 24 to engage one of the contacts, dependent upon the provided binary digit, the coupling between the read circuit 32 and the winding 22 is disabled. This is the enable write, disable read operating condition. On the other hand, when the read circuit 32 is coupled to the winding 22, then the timing means 34 causes the input source 30 to disengage the pole 24 from either of the contacts 26 or 28. This is the disable write, enable read operating condition.

Consider the arbitrarily selected series of binary digits illustrated in FIGURE 2($a$). The input source 30 couples hte pole 24 to the contacts 26 in response to "0" bits and to the contact 28 in response to "1" bits. Thus, negative current pulses will be initiated in the winding 22 when "0" bits are to be written and positive current pulses will be initiated when "1" bits are to be written. The write current waveform for the illustrated series of bits is also illustrated in FIGURE 2($a$). The timing means 34 controls the current pulses so that their duration is preferably no more than one-half the interval between binary digits successively provided by the source 30.

The current waveform in FIGURE 2($a$) is illustrated as a function of time. FIGURE 2($b$) illustrates the flux pattern developed on the tape 10 as a consequence of the current waveform of FIGURE 2($a$). Each current pulse initiated in winding 22 influences a spot on the tape 10 which extends slightly forwardly and rearwardly of the gap in the head 80. This is shown in FIGURE 2($b$) which illustrates the flux distribution on the tape 10 as a function of tape displacement X. The current pulses illustrated in FIGURE 2($a$) can be developed when the tape is stationary, as in an incremental tape movement system, or while the tape is moving relatively slowly. In either case, the current pulse should be terminated prior to the lagging fringe of the tape spot moving out of the field of influence of the gap in head 20.

FIGURE 2($c$) illustrates the voltage waveform induced in the winding 22 by moving the tape portion having the flux distribution illustrated in FIGURE 2($b$) by the head 20. Inasmuch as the timing means 34 effectively decouples the read circuit 32 from the winding 22 during the intervals in which the current pulses are applied to the winding 22, the shaded portions of the output voltage waveform in FIGURE 2($c$) are not sensed by the read circuit 32. The unshaded portions of the voltage waveform of FIGURE 2($c$) are sufficient to indicate the bit pattern recorded on the tape.

The method of recording binary digital information shown in FIGURE 2($b$) constitutes a return-to-zero (RZ) recording method inasmuch as it will be noted that the flux distribution between successively recorded digits is zero. Inasmuch as it is unnecessary to maintain a current through the winding 22 of head 20 at all times, this method can, as discussed, be used in a magnetic recording system in which a single head is used to both write information on and read information from a magnetic surface moved by the head a single time. The capability to write and immediately read the written information on a character by character basis is a significant advantage in this system. This is particularly important in high reliability systems where immediate verification of the written data must be made.

Attention is now called to FIGURE 3 which is directed to a preferred embodiment of the invention diagrammatically illustrating a second form of apparatus and a second method which permits digital information to be written on and immediately read from a magnetic recording surface.

In FIGURE 3, a first magnetic head 40 is coupled to the tape 10 adapted to incrementally or continuously move in the direction of the arrow. The head 40 has a winding 42 coupled thereto which winding is connected in series with a switch 44 and a direct current source such as a battery 46. By closing the switch 44 and moving the tape 10 by the head 40, the residual flux on the tape 10 can be saturated in a first direction which is represented in FIGURE 4($b$) as $-\phi$. The single head 40 is preferably coupled to all of the tracks defined on the tape.

Each of a plurality of record heads 48 is coupled to a different recording track. Each second head 48 has a winding 50 coupled thereto. The winding 50 is connected in series with a switch 52 and a direct current source 54. The switch 52 is controlled by an input source 56 analogous to the input source 30 of FIGURE 1. One terminal of the winding 50 is connected to a read circuit 58 analogous to the read circuit 32 of FIGURE 1. A timing means 60, similar to the timing means 34 of FIGURE 1 is connected to the input source 56 and read circuit 58. The input source 56 of FIGURE 3 exercises control over the switch 52 such that in response to "1" bits being provided thereby, the switch 52 is closed for a short interval to consequently initiate a positive current pulse in the winding 50. In response to "0" bits, the switch 52 is not closed. Thus, again assuming the arbitrary series of bits shown in FIGURE 4($a$) the current waveform illustrated in FIGURE 4($a$) will be initiated in the winding 50. As a consequence of the current waveform in FIGURE 4($a$), the flux distribution along a length of tape will appear as is illustrated in FIGURE 4($b$). It will be noted that the flux on the tape will either be saturated in the bias direction $-\phi$ or in the opposite direction $+\phi$. Movement of the tape 10 by the gap in head 48 will induce the voltage waveform shown in FIGURE 4($c$). Inasmuch as the read circuit 58 is however decoupled from the winding 50 until after each current pulse is extinguished, the shaded portion of the waveform of FIGURE 4($c$) will not be sensed by the read circuit 58. The unshaded portion of the output voltage waveform will be sufficient to sense the recorded digits.

It should be noted that the method and apparatus of FIGURE 3 are characterized by at least two desirable features not characteristic of the apparatus and RZ method of recording illustrated in FIGURE 1. That is, the current pulses initiated in the read-write head winding need be of only one polarity with the RB recording method of FIGURE 3. Even more significant however, the amplitude of the output voltage derived in FIGURE 3 is approximately twice as great as that derived utilizing the RZ recording method of FIGURE 1. Both recording methods are of course characterized by not requiring that a write current be maintained in the read-wire head winding between the recording of successive bits. By eliminating the requirement of maintaining a current in the read-write head winding, reading and writing can be accomplished by a single head requiring the magnetic recording medium to be moved by the head only once.

While the above detailed description has shown, described and pointed out the fundamental novel features of the invention as applied to a preferred embodiment, it will be understood that various omissions and substitutions and changes in the form and details of the device and method illustrated and in its operation may be made by those skilled in the art, without departing from the spirit of the invention. It is the intention, therefore, to be limited only as indicated by the scope of the following claims.

What is claimed is:

1. In a magnetic recording system including a movable magnetic medium, a first magnetic head having a winding thereon, a second magnetic head having a winding thereon, a serial source of information digits, and a read circuit;

means for initially applying a selected current signal to said first head winding and for moving said magnetic medium by said first head to establish a selected condition in said medium;

means for subsequently applying selected write pulses to said second head winding in accordance with said digits provided by said source, said write pulses being of a sufficiently short duration so that an interval is defined between the application of successive pulses to said head winding which interval has a duration substantially greater than the duration of a pulse and during which no write current is applied in said second head winding;

means for selectively coupling said second head winding to said read circuit between the application of successive pulses thereto and for decoupling the second head winding from the read circuit during the pulses; and means for decoupling said second head winding from said serial source between the application of said write pulses and for coupling the second head winding to the serial source during the application of the pulses, said means for applying write pulses and said means for coupling said second head winding to said read circuit immediately thereafter, operating during a single pass of said medium by said second head.

2. The system of claim 1 wherein said magnetic medium defines a plurality of tracks;

means coupling said first head to all of said tracks; and means for coupling a different second head to each of said tracks.

3. The system of claim 1 wherein;

said selected current comprises an alternating current signal applied to said winding on said first head while initially moving said medium by said first head to establish a zero flux condition in said medium; and said selected write pulses are oppositely directed current pulses for establishing oppositely directed flux conditions which is opposite to the zero flux condition.

4. In a magnetic recording system including a movable magnetic medium, a first magnetic head having a winding thereon, a second magnetic head having a winding thereon, a serial source of information digits, and a read circuit;

means for initially applying a direct current signal to said first head winding and for moving said magnetic medium by said first head to orient the flux of said medium in a first direction;

means for subsequently applying a first polarity pulse to said second head winding in response to one type of digit provided by said source, said pulses being of a sufficiently short duration so that an interval is defined between the application of successive pulses to said head winding which interval has a duration substantially greater than the duration of a pulse and during which no write current flows in said second head winding;

means for coupling said second head winding to said read circuit between the application of successive pulses thereto and for decoupling the second head winding from the read circuit during the pulses; and means for decoupling said second head winding from said serial source between the application of said write pulses and for coupling the second head winding to the serial source during the application of the pulses, said means for applying said first polarity pulses and said means for coupling said second head winding to said read circuit immediately thereafter, operating during a single pass of said medium by said second head.

5. The system of claim 4 wherein said magnetic medium defines a plurality of tracks;

means coupling said first head to all of said tracks; and means for coupling a different second head to each of said tracks.

6. A method of recording digital information comprised of random "1" and "0" bits successively provided by an input source on a movable magnetic medium having a magnetic head coupled thereto, said head having a winding thereon, and immediately reading the successful recording of the bits by means of a read circuit detachably coupled to the winding, said method comprising the steps of:

initially orienting the flux in said medium in a first direction;

applying a current pulse to said head winding in response to the provision of each "1" bit in a direction to switch said flux to a second direction;

detaching the read circuit from the head winding during the application of current pulses;

limiting the duration of each of said current pulses to at most substantially one-half the interval between successively provided bits;

detecting the existence of the "1" and "0" bits by coupling said read circuit to said winding during the intervals between the application of current pulses; and detaching the input source from said head winding during the detection of the "1" and "0" bits, said recording and said immediate playback occurring during a single pass of said medium by said head.

References Cited

UNITED STATES PATENTS

| | | | |
|---|---|---|---|
| 2,789,026 | 4/1957 | Nordyke | 340—174.1 X |
| 3,056,950 | 10/1962 | Birmingham et al. | 340—174.1 |
| 3,243,789 | 3/1966 | Ragle | 340—174.1 |
| 3,251,046 | 5/1966 | Ragle et al. | 340—174.1 |

BERNARD KONICK, *Primary Examiner.*

A. I. NEUSTADT, *Assistant Examiner.*